(12) United States Patent
Akkarakaran et al.

(10) Patent No.: US 12,501,516 B2
(45) Date of Patent: Dec. 16, 2025

(54) SIDELINK MEDIUM ACCESS CONTROL (MAC) CONTROL ELEMENT (CE) DESIGNS

(71) Applicant: QUALCOMM Incorporated, San Diego, CA (US)

(72) Inventors: Sony Akkarakaran, Poway, CA (US); Tao Luo, San Diego, CA (US); Hong Cheng, Basking Ridge, NJ (US); Kapil Gulati, Belle Mead, NJ (US); Jung Ho Ryu, Fort Lee, NJ (US); Juan Montojo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 64 days.

(21) Appl. No.: 17/092,101

(22) Filed: Nov. 6, 2020

(65) Prior Publication Data

US 2021/0144800 A1    May 13, 2021

Related U.S. Application Data

(60) Provisional application No. 62/932,803, filed on Nov. 8, 2019.

(51) Int. Cl.
*H04W 4/40* (2018.01)
*H04W 28/02* (2009.01)
(Continued)

(52) U.S. Cl.
CPC ............. *H04W 80/02* (2013.01); *H04W 4/40* (2018.02); *H04W 28/0278* (2013.01);
(Continued)

(58) Field of Classification Search
CPC ... H04W 4/40; H04W 24/08; H04W 28/0278; H04W 72/042; H04W 72/1284; H04W 72/1289; H04W 80/02; H04W 92/18
(Continued)

(56) References Cited

U.S. PATENT DOCUMENTS

2017/0353819 A1* 12/2017 Yin ................... H04W 72/1284
2017/0374579 A1  12/2017 Wang et al.
(Continued)

FOREIGN PATENT DOCUMENTS

| CN | 109547168 A | 3/2019 |
|---|---|---|
| WO | 2018174642 A1 | 9/2018 |
| WO | 2019159024 A1 | 8/2019 |

OTHER PUBLICATIONS

Steven M. Kaplan, Wiley Electrical & Electronics Engineering Dictionary 507-08 (2004).*
(Continued)

*Primary Examiner* — Harun Chowdhury
(74) *Attorney, Agent, or Firm* — Patterson & Sheridan LLP

(57) ABSTRACT

Certain aspects of the present disclosure provide techniques for conveying information via medium access control (MAC) control element (CEs). In some cases, the MAC-CEs may relate to sidelink communications between two user equipments (UEs). A first wireless node may send the first MAC-CE on at least one of a sidelink or a cellular link and provide providing routing information for the first MAC-CE. The routing information may indicate, for example, a source node, a destination node, or a transit route through one or more nodes. The routing information may also indicate whether traffic sent with the first MAC-CE is relayed traffic or traffic originating at the first node.

25 Claims, 10 Drawing Sheets

(51) Int. Cl.
  *H04W 52/36* (2009.01)
  *H04W 56/00* (2009.01)
  *H04W 80/02* (2009.01)
  *H04W 92/18* (2009.01)

(52) U.S. Cl.
  CPC ..... *H04W 52/365* (2013.01); *H04W 56/0045* (2013.01); *H04W 92/18* (2013.01)

(58) Field of Classification Search
  USPC .......................... 370/230, 329, 392; 455/450
  See application file for complete search history.

(56) References Cited

U.S. PATENT DOCUMENTS

2020/0029353 A1* 1/2020 Xu .................... H04W 72/1284
2020/0267597 A1* 8/2020 Huang .............. H04W 72/1289
2020/0314819 A1* 10/2020 Loehr ................ H04W 72/042

OTHER PUBLICATIONS

International Search Report and Written Opinion—PCT/US2020/059574—ISA/EPO—Feb. 4, 2021.

\* cited by examiner

SIDELINK MEDIUM ACCESS CONTROL (MAC) CONTROL ELEMENT (CE) DESIGNS

CROSS-REFERENCE TO RELATED APPLICATIONS

This application claims benefit of and priority to U.S. Provisional Patent Application No. 62/932,803, filed Nov. 8, 2019, which is assigned to the assignee hereof and herein incorporated by reference in its entirety as if fully set forth below and for all applicable purposes.

FIELD OF THE DISCLOSURE

Aspects of the present disclosure relate to wireless communications, and more particularly, to techniques for generating and utilizing sidelink communication related medium access control (MAC) control elements (CEs).

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims, which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a first node. The method generally includes preparing at least a first medium access control (MAC) control element (CE) related to sidelink communications between two user equipments (UEs), sending the first MAC-CE on at least one of a sidelink or a cellular link, and providing routing information for the first MAC-CE.

Certain aspects provide a method for wireless communication by a second node. The method generally includes receiving from a first node, on at least one of a sidelink or a cellular link, at least a first medium access control (MAC) control element (CE) related to sidelink communications between two user equipments (UEs), obtaining routing information for the first MAC-CE, and processing first MAC-CE based, at least in part, on the routing information.

Certain aspects provide a method for wireless communication by a first node. The method generally includes sending a medium access control (MAC) control element (CE) to activate or deactivate resources or a service related to sidelink communications between two user equipments (UEs) and determining timing for the activation or deactivation based, at least in part, on routing information for the first MAC-CE.

Certain aspects provide a method for wireless communication by a second node. The method generally includes receiving a medium access control (MAC) control element (CE) to activate or deactivate resources or a service related to sidelink communications between two user equipments (UEs) and determining timing for the activation or deactivation based, at least in part, on routing information for the first MAC-CE.

Certain aspects provide means for, apparatus, and/or computer readable medium having computer executable code stored thereon, for performing the techniques described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
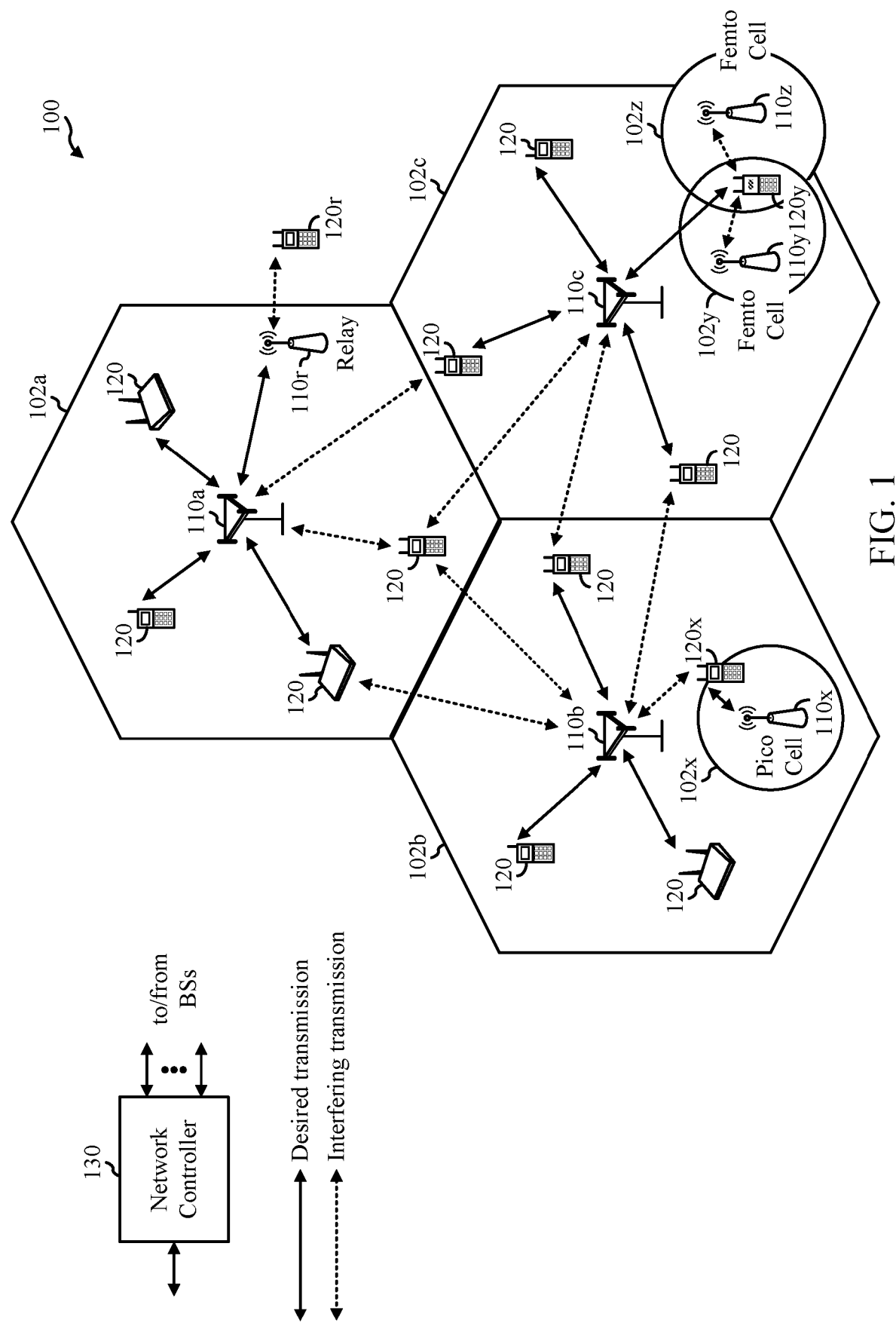
FIG. 1 is a block diagram conceptually illustrating an example telecommunications system, in accordance with certain aspects of the present disclosure.

Aspects of the present disclosure provide apparatus, methods, processing systems, and computer readable mediums for generating and processing sideline MAC-CEs.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, UEs 120 and/or BS 110 of FIG. 1 may be configured to perform operations described below with reference to FIGS. 8-12 to generate and/or process sidelink MAC-CEs.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
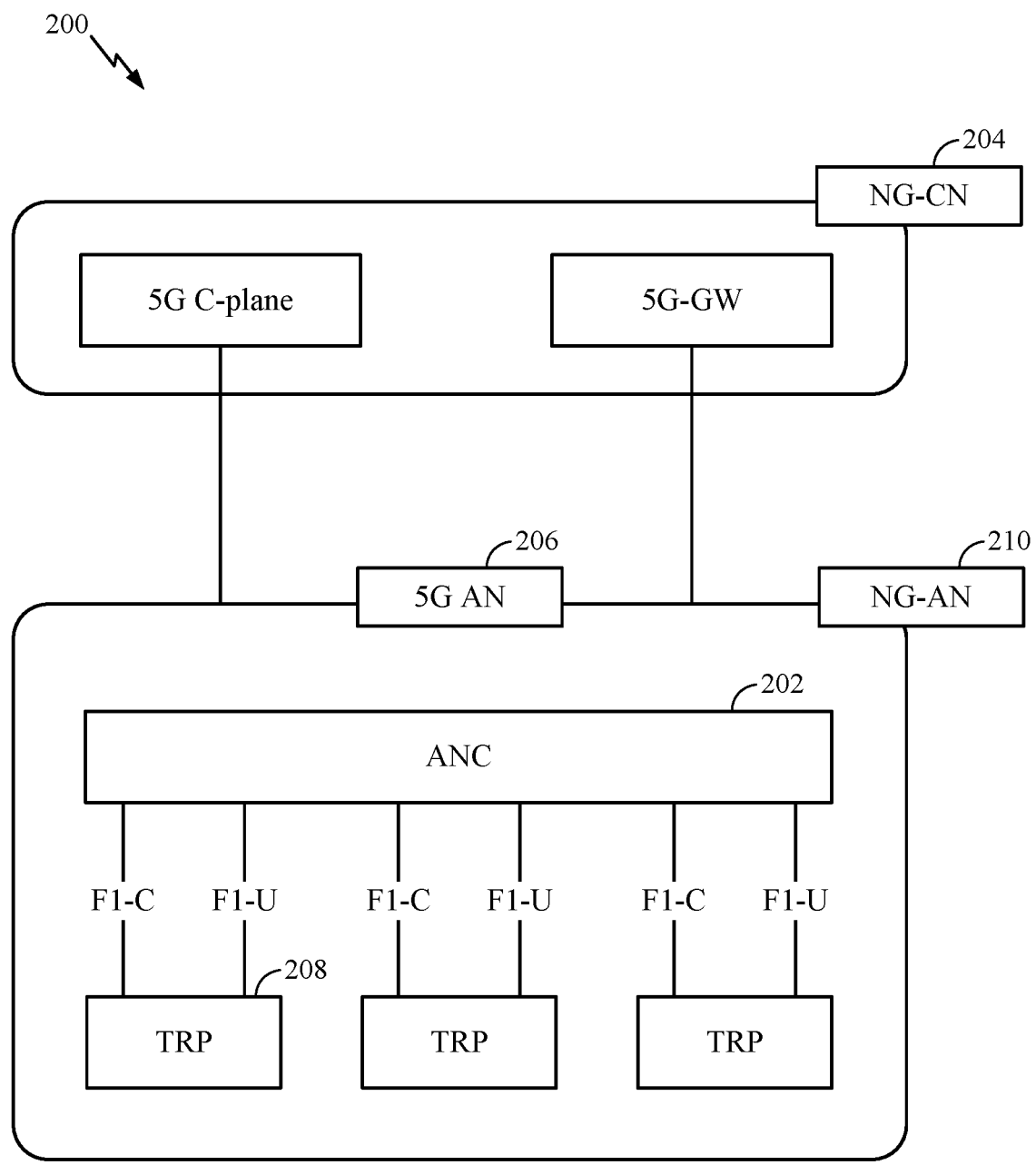
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
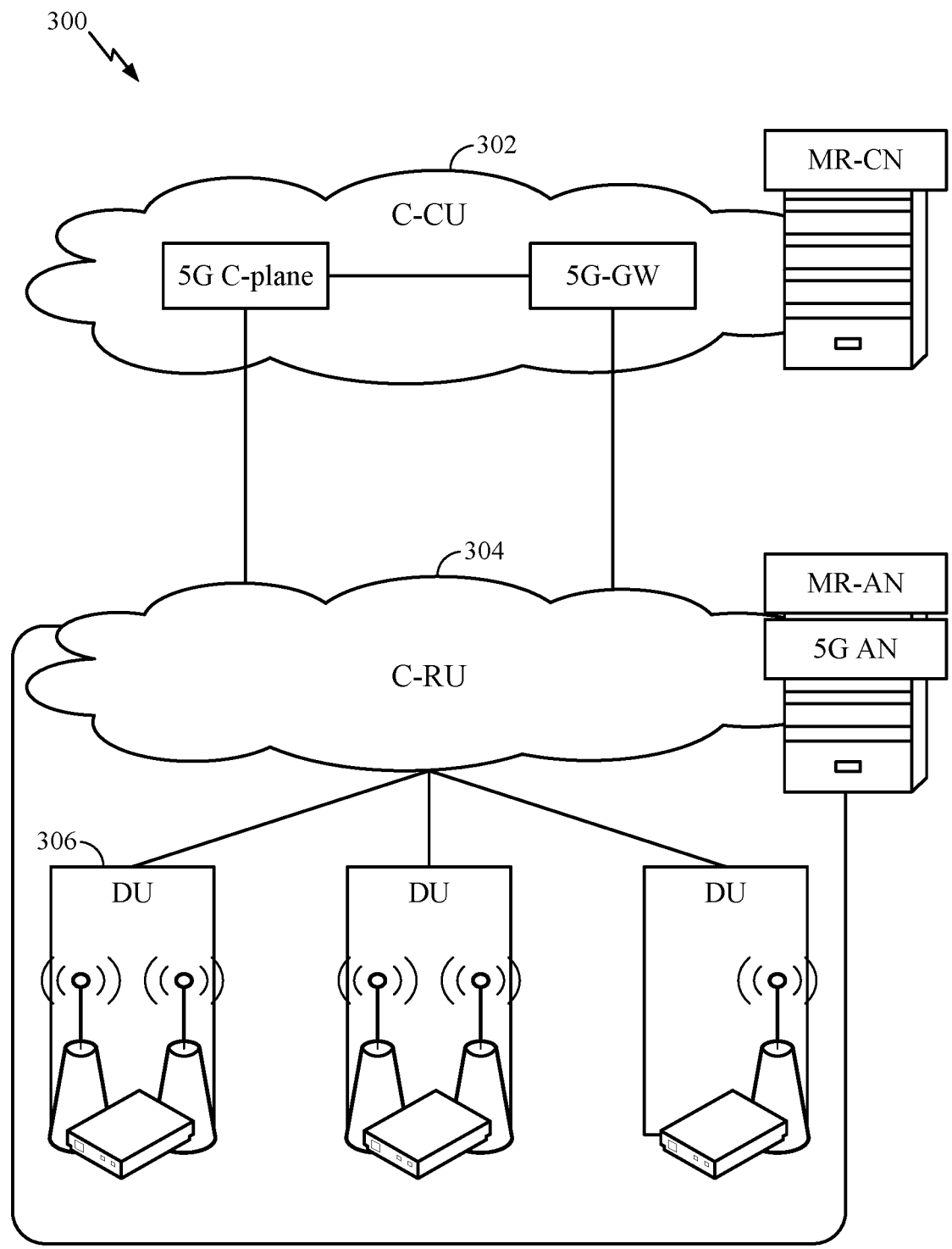
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
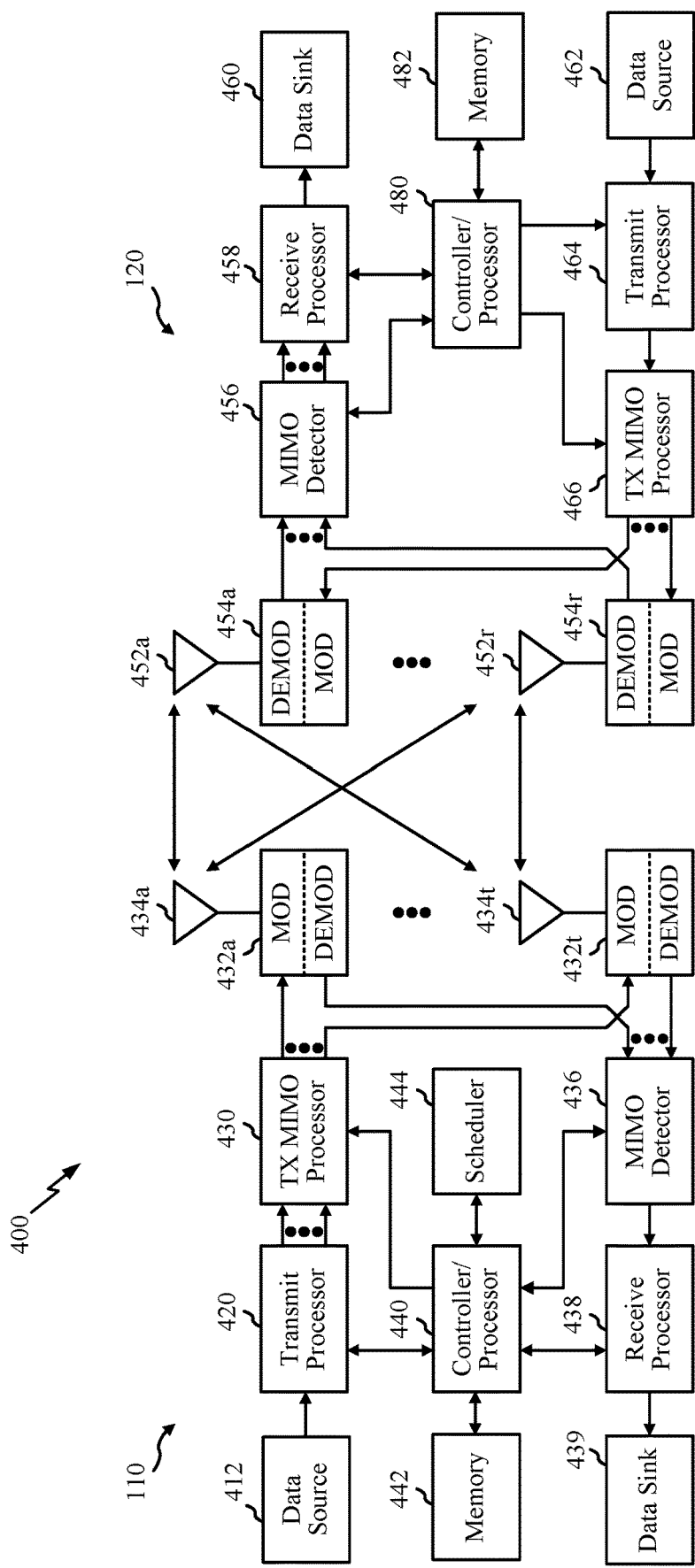
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein with reference to FIGS. 7-10.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452*a* through 452*r* may receive the downlink signals from the base station 110 and may provide received signals to the demodulators (DE-MODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 5:
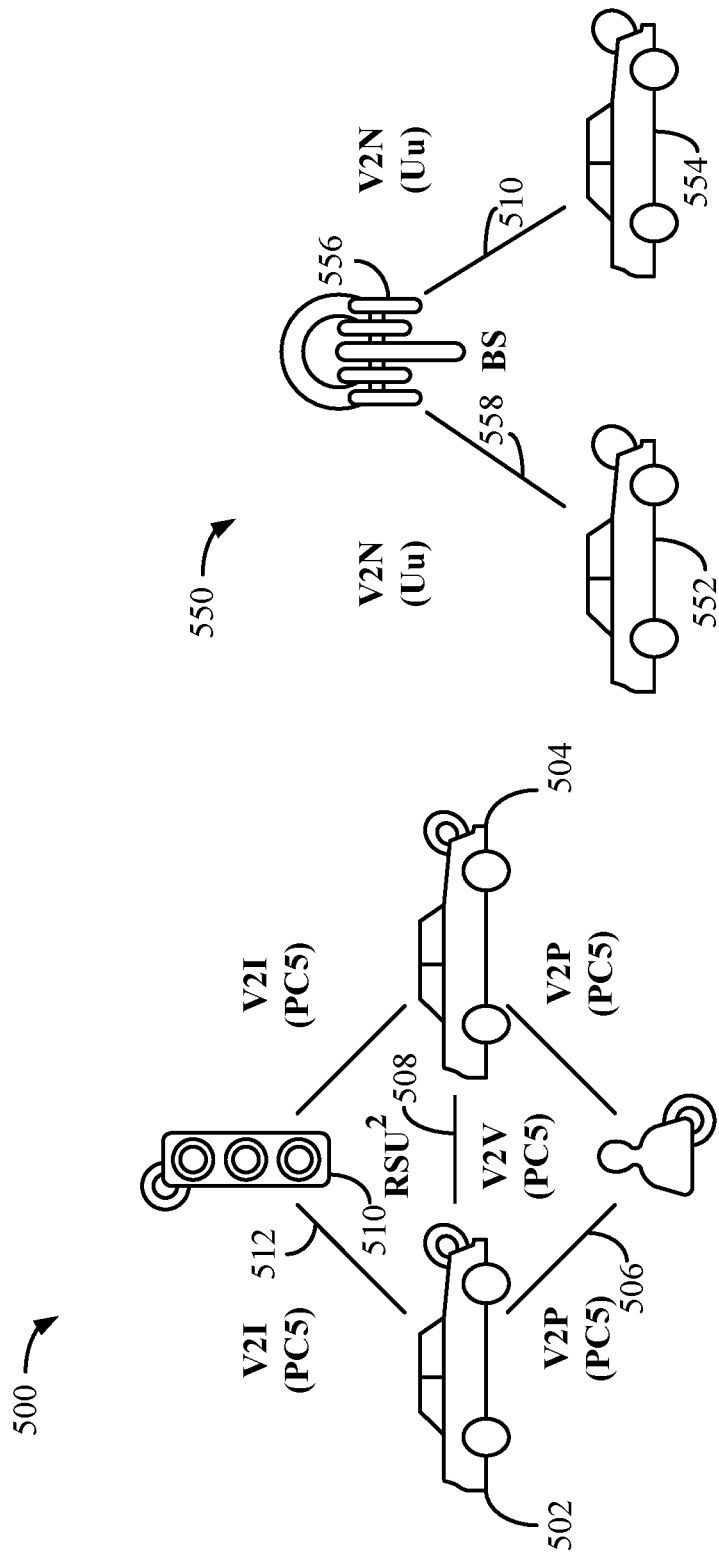
FIGS. 5A and 5B show diagrammatic representations of example vehicle to everything (V2X) systems in accordance with some aspects of the present disclosure.

FIGS. 5A and 5B show diagrammatic representations of example vehicle to everything (V2X) systems in accordance with some aspects of the present disclosure. For example, the vehicles shown in FIGS. 5A and 5B may communicate via sidelink channels and may perform sidelink CSI reporting as described herein.

The V2X systems, provided in FIGS. 5A and 5B provide two complementary transmission modes. A first transmission mode, shown by way of example in FIG. 5A, involves direct communications (for example, also referred to as side link communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (for example, including vehicle to vehicle (V2V) communications) is illustrated with two vehicles 502, 504. The first transmission mode allows for direct communication between different participants in a given geographic location. As illustrated, a vehicle can have a wireless communication link 506 with an individual (V2P) (for example, via a UE) through a PC5 interface. Communications between the vehicles 502 and 504 may also occur through a PC5 interface 508. In a like manner, communication may occur from a vehicle 502 to other highway components (for example, highway component 510), such as a traffic signal or sign (V2I) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. These network communications may occur through discrete nodes, such as a base station (for example, an eNB or gNB), that sends and receives information to and from (for example, relays information between) vehicles 552, 554. The network communications through vehicle to network (V2N) links 558 and 510 may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

For the operation regarding PSSCH, a UE performs either transmission or reception in a slot on a carrier. NR sidelink supports for a UE a case where all the symbols in a slot are available for sidelink, as well as another case where only a subset of consecutive symbols in a slot is available for sidelink.

PSFCH may carry feedback such as channel state information (CSI) related to a sidelink channel quality. A sequence-based PSFCH format with one symbol (not including AGC training period) may be supported. The following formats may be possible: a PSFCH format based on PUCCH format 2 and a PSFCH format spanning all available symbols for sidelink in a slot.

Figure 6:
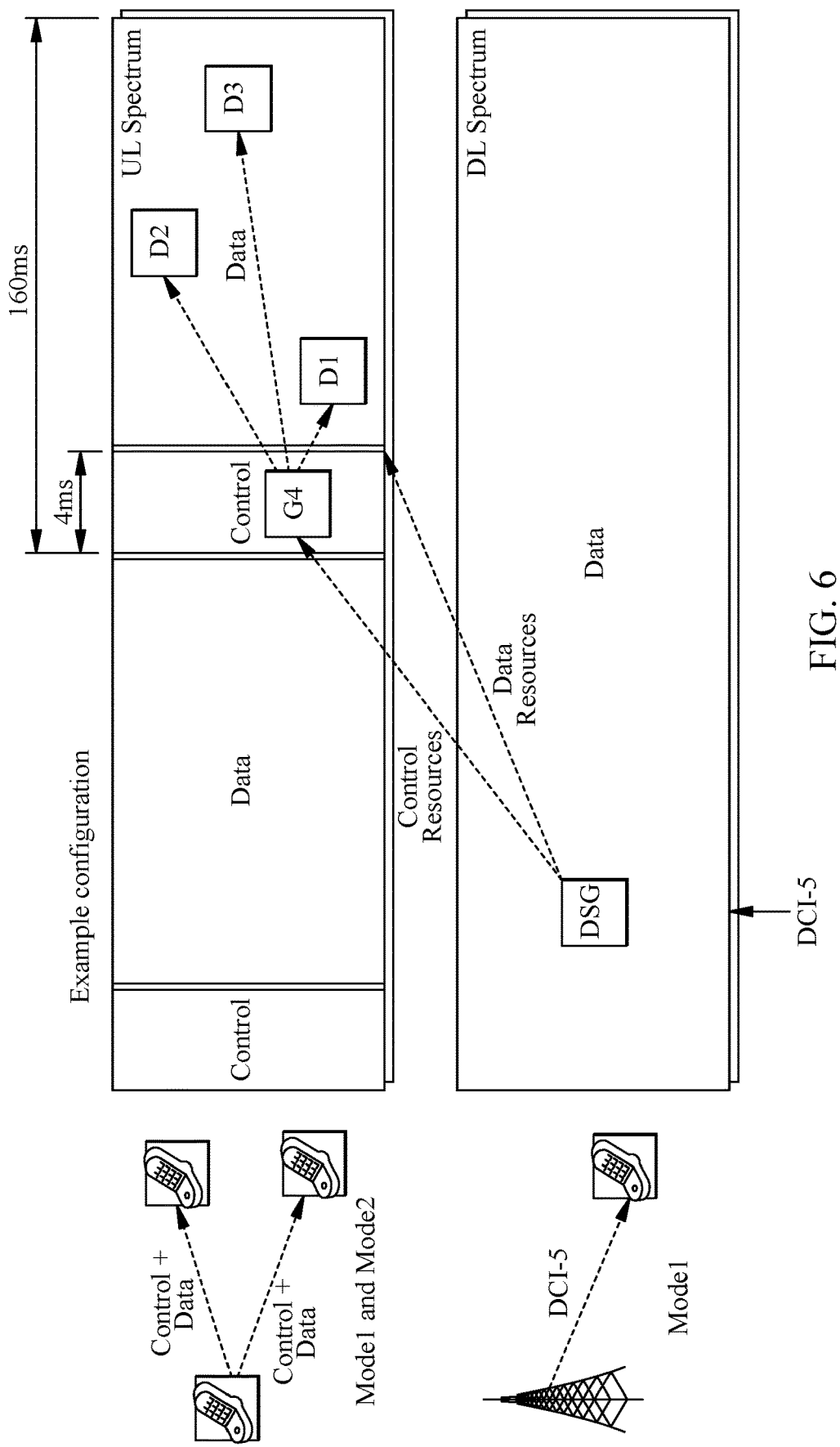
FIG. 6 illustrate example sidelink communications modes.

FIG. 6 provides an overview of sidelink communications (broadcast and groupcast device-to-device or D2D) between UEs. As noted above, with reference to FIGS. 5A and 5B, sidelink generally refers to the link between two users or user-relays can be used in different scenarios and for different applications.

For example, for applications with in-coverage operation, both users are in a gNB's coverage, but directly communicate. This can be assumed for enabling some gaming applications. For applications with partial-coverage operation, one UE is in-coverage, and acts as a relay to extend the coverage for other users. For application with out-of-coverage operation, users are outside the gNB's coverage, but still need to communicate. This type of operation is important for mission critical applications, such as V2X and public safety.

As illustrated in FIG. 6, the resource allocation for sidelink communications can be done in different ways. In a first mode, Mode 1, the gNB "schedules" the sidelink resources to be used by the UE for SL transmission.

For a second mode, Mode 2, the UE determines the sidelink resources (the gNB does not schedule SL transmission resources within SL resources configured by gNB/network). In this case, the UE autonomously selects SL resources for transmission. A UE can assist in SL resource selection for other UEs. A UE may configured with an NR configured grant for SL transmission and the UE may schedule SL transmissions for other UEs.

Example Sidelink MAC-CE Designs

Certain aspects of the present disclosure provide techniques for conveying information via medium access control (MAC) control element (CEs). In some cases, the MAC-CEs may relate to sidelink communications between two user equipments (UEs).

MAC-CEs have advantages over other types of command messages, albeit at some cost. For example, MAC-CEs have increased reliability provided by hybrid automatic repeat request (HARQ), but with a correspondingly increased latency. HARQ acknowledgement (Ack) or negative-acknowledgement (Nack) respectively provides confirmation that a MAC-CE (e.g., a command) has been received or otherwise.

Alternative command messages (to MAC-CEs) include downlink control information (DCI) on DL, and uplink control information (UCI) on UL (e.g., via PUCCH or PUSCH). While these messages have no HARQ Ack/Nack, they are generally less reliable, but have a lower latency.

MAC-CEs are used in sidelink communications (e.g., per one of the modes described above with reference to FIG. 6) for various reasons. For example, a sidelink buffer status report (SL-BSR) MAC-CE may be sent on the cellular link (Uu) but indicates buffer-status of sidelink traffic (e.g., a UE has sidelink traffic to send to another UE and requests resources of a gNB per Mode 1).

Further, for NR V2X, a CSI report may be sent over a sidelink MAC-CE. This approach may avoid a UE having to implement receiver for UCI-multiplexing.

For advanced systems (e.g., in Rel-17), use cases may call for more (and different) types of sidelink-related MAC-CEs. Such MAC-CEs may include both MAC-CEs sent over Uu and MAC-CEs sent over sidelink (carrying sidelink-related information in both cases).

In the case of sidelink relaying, MAC-CEs may indicate relayed traffic or originating traffic. In some cases, the techniques provided herein allow for MAC-CEs to be sent via aggregation on sidelink (PC5) and cellular (Uu) links. For example, some or all code block grous (CBGs) of a transport block (TB) may be sent on one link, while other CBGs of the TB may be sent on the other link. In the case of Uu-PC5 slot-aggregation (where both cellular and sidelinks may be used), special handling for MAC-CEs may be considered. For example, a MAC-CE may indicate which code block groups (CBGs of a transport block/TB) come from which link.

In some cases, a MAC-CE may indicate which CBGs carry other MAC-CEs. MAC-CEs may be placed at the beginning of a TB or at the end, for example, depending on urgency.

Aspects of the present disclosure provide sidelink related MAC-CE designs that may accommodate these various use cases. For example, in some cases, the MAC-CEs may including routing information that may help a recipient identify and process different types of traffic (e.g., relayed traffic/original traffic, traffic sent via sidelink/traffic sent via Uu).

Figure 7:
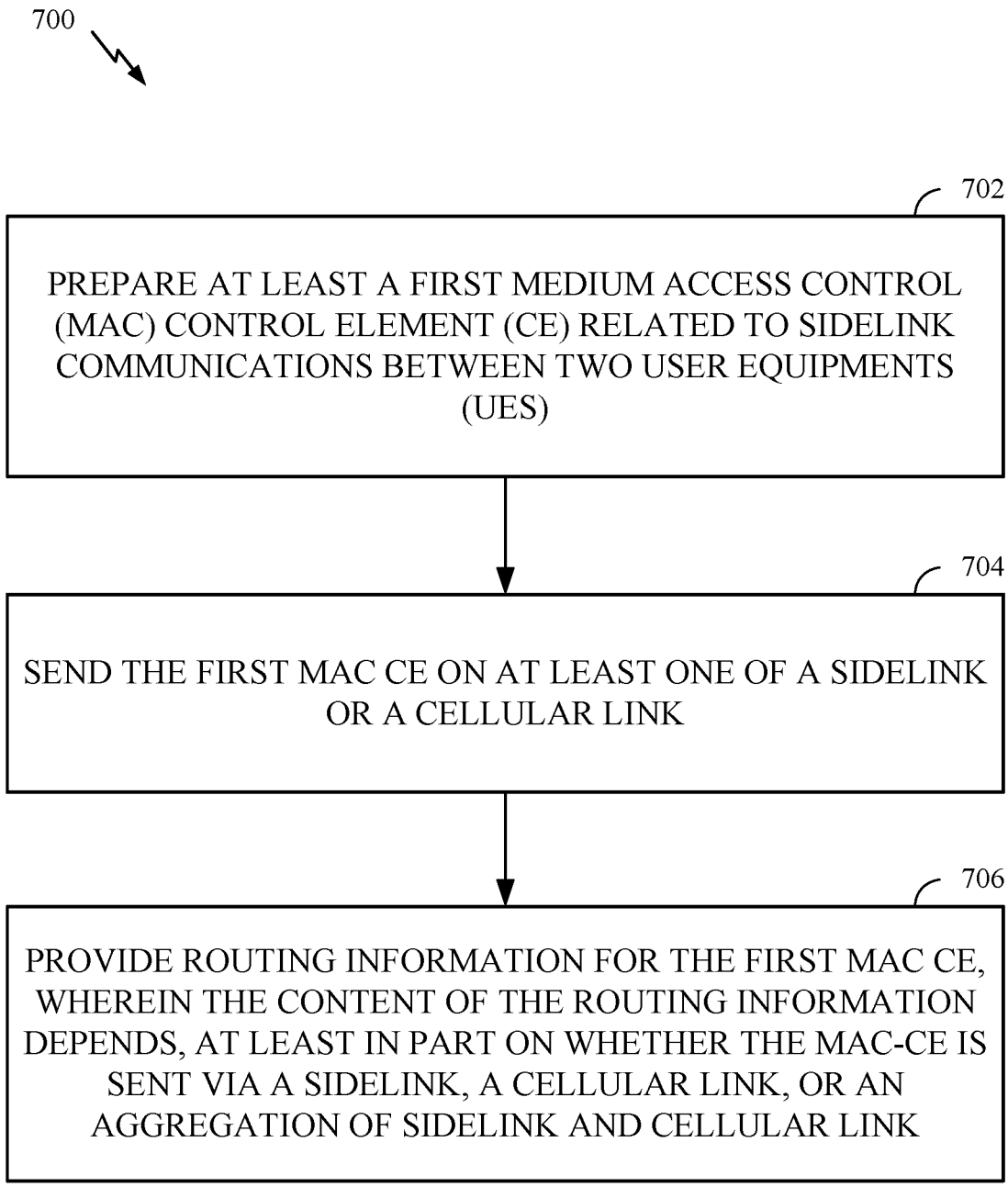
FIG. 7 is a flow diagram illustrating example operations that may be performed by a first node, in accordance with certain aspects of the present disclosure.

FIG. 7 is a flow diagram illustrating example operations 700 that may be performed by a first node, in accordance with certain aspects of the present disclosure. For example, operations 700 may be performed by a UE or base station (e.g., either being the first node) shown in FIG. 6. In some examples, the first node may be any of the BS 556, vehicle 502, vehicle 504, vehicle 552, or vehicle 554 of FIG. 5.

Operations 700 begin, at 702, by preparing at least a first medium access control (MAC) control element (CE) related to sidelink communications between two user equipments (UEs). For example, the preparation may include appending relaying or routing information to Uu MAC-CEs. When the MAC-CEs are for the use of sidelink, the preparation may include including sidelink related content (examples provided below).

At 704, the first node sends the first MAC-CE on at least one of a sidelink (e.g., PC5) or a cellular link (e.g., Uu). At 706, the first node provides routing information for the first MAC-CE. For example, the relaying or routing information may indicate one or more of source node, destination node, and transit route. In some cases, the relaying or routing information may be separately indicated, such as in RRC, DCI, or sidelink equivalents to the RRC and DCI. In some cases, when the sidelink related content is relayed, routing information may be padded or removed for sidelink-relayed MAC-CE.

Figure 8:
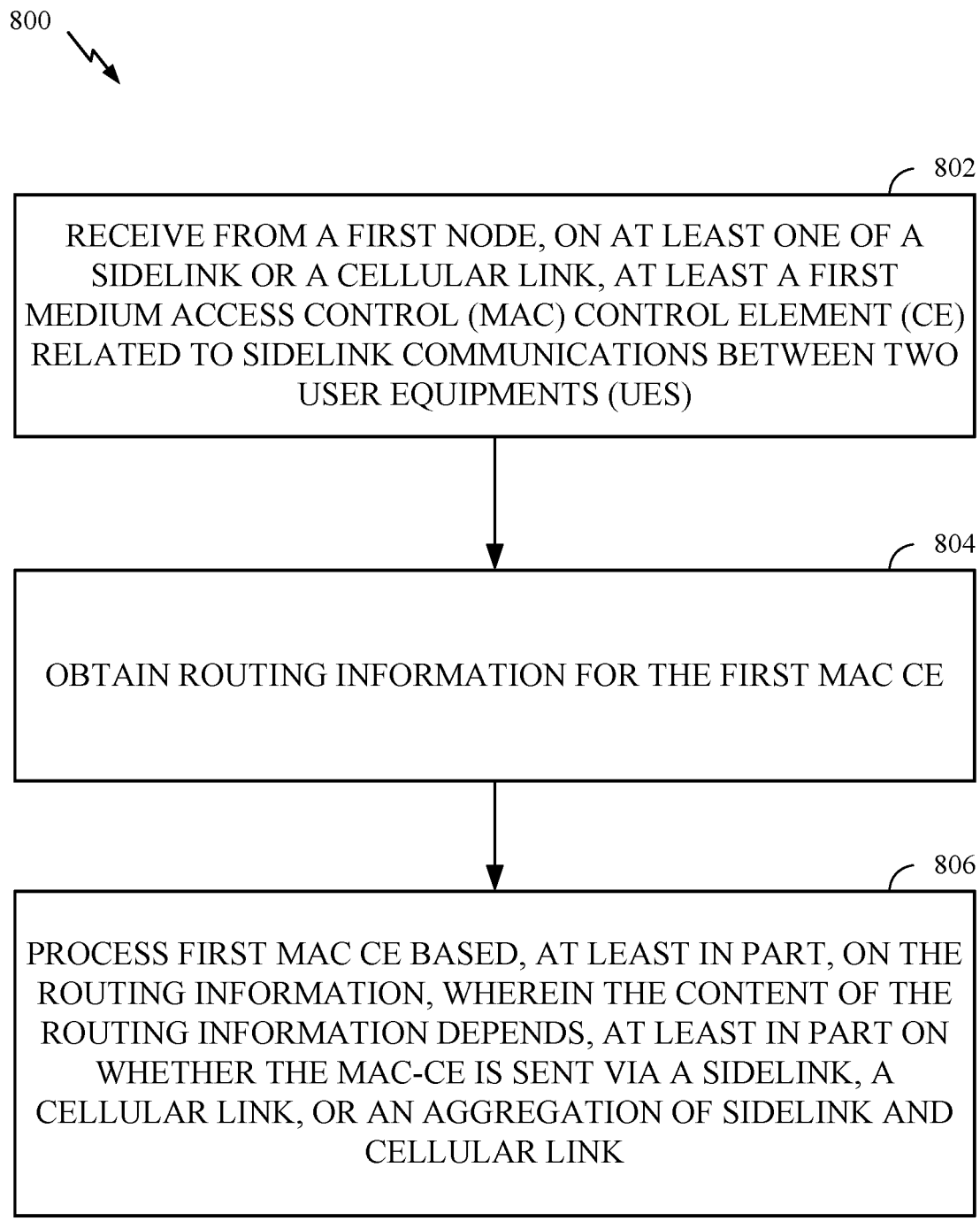
FIG. 8 is a flow diagram illustrating example operations that may be performed by a second node, in accordance with certain aspects of the present disclosure.

FIG. 8 is a flow diagram illustrating example operations 800 that may be performed by a second node, in accordance with certain aspects of the present disclosure. For example, operations 800 may be performed by a UE or base station (e.g., either being the second node) shown in FIG. 6. Operations 800 may be complementary to operations 700 of FIG. 7, such as when the second node is configured to communicate with the first node of operations 700 in a sidelink channel. Likewise, in some examples, the second node may be another one of any of the BS 556, vehicle 502, vehicle 504, vehicle 552, or vehicle 554 of FIG. 5.

Operations 800 begin, at 802, by receiving from a first node, such as the first node of operations 700, on at least one of a sidelink or a cellular link, at least a first medium access control (MAC) control element (CE) related to sidelink communications between two user equipments (UEs). At 804, the second node obtains routing information for the first MAC-CE. At 806, the second node processes first MAC-CE based, at least in part, on the routing information. Details of sidelink related MAC-CEs are provided below.

There are various types of sidelink related MAC-CEs. These include, for example, Uu MAC-CEs (DL or UL) relayed via sidelink, MAC-CEs sent on SL with SL-related content, and MAC-CEs sent on Uu with SL-related content (e.g., SL-BSR).

In some cases, routing information in a relayed MAC-CE may be modified relative to the original (received) MAC-CE (e.g., adding or removing routing information). For Uu MAC-CEs (DL or UL) relayed via sidelink, relaying/routing information may be appended. As an alternative, routing (and/or relaying) information may be provided separately (e.g., indicated via RRC/MAC-CE/DCI or their sidelink equivalents). As used herein, the term routing information includes relaying information and such information may indicate, for example, one or more of source-node, destination node, or a transit route). If the last leg of a relayed route is via cellular (Uu), then routing information may be removed at that point (or some/all may be kept, such as a source ID). In some cases, the last leg may be combined sidelink and cellular (Uu+PC5), in case of Uu+PC5 slot-aggregation. In such cases, the routing information indication may be different in this case as compared to Uu-only (e.g., routing information may indicate which link different MAC-CEs are sent on).

MAC-CEs sent on SL may convey various SL-related content. For example, a MAC-CE may include sidelink CSI (SL-CSI), sidelink timing advance (SL-TA), sidelink transmit power control (SL-TPC) command, sidelink scheduling requests (SL-SR), sidelink buffer status reports (SL-BSR), or sidelink power headroom reports (SL-PHR). In some cases, sidelink MAC-CEs may be used for activation/deactivation of resources or services, such as sidelink semi persistent scheduling (SL-SPS) or sidelink configured grants (SL-CG analogous to SPS UL) and/or aperiodic or semi-persistent CSI-RS or SRS (A/SP SL-CSIRS/SRS). In case such MAC-CEs are relayed over SL, routing information may be modified (e.g., added/removed) as noted in the above described case of SL-relayed Uu MAC-CE.

MAC-CEs may also be sent on Uu with SL-related content, such as the aforementioned SL-BSR to indicate a UE has sidelink traffic to send and requests a grant of resources from a base station. Other types of MAC-CEs sent on Uu may include SL-PHR, TPC, recommended bit-rate, CBR/CR, and the like. In some cases, the MAC-CEs may be sent as gNB-relayed versions of the types of MAC-CEs described above that might be sent on SL with SL-related content (e.g., rather than send directly to another UE, a UE may send via a base station).

In the case of MAC-CEs sent via Uu+PC5 slot-aggregation, a 'header' MAC-CE may be used to indicate which CBGs come from which link (Uu or PC5 or both). Such a MAC-CE may also indicate locations of other MAC-CEs (e.g., which CBGs have MAC-CEs) and/or on which link they are sent (Uu or PC5 or both).

In the case of MAC-CE commands, corresponding activation/deactivation of resources or services is often based on the timing of acknowledgment of the command. For example, some activation/deactivation of SPS resources may occur n subframes after a corresponding command is acknowledged (ACK'd), for example, via a HARQ Ack. In the case of relayed MAC-CEs, however, it may be difficult to determine timing due to the possible variable delay due to different routes (with different numbers of hops).

Aspects of the present disclosure, however, may help address this issue by considering routing/relaying information when determining MAC-CE activation time, thus providing sidelink related MAC-CE designs that may accommodate these various use cases. For example, in some cases, the MAC-CEs may including routing information that may help a recipient identify and process different types of traffic (e.g., relayed traffic/original traffic, traffic sent via sidelink/traffic sent via Uu).

Figure 9:
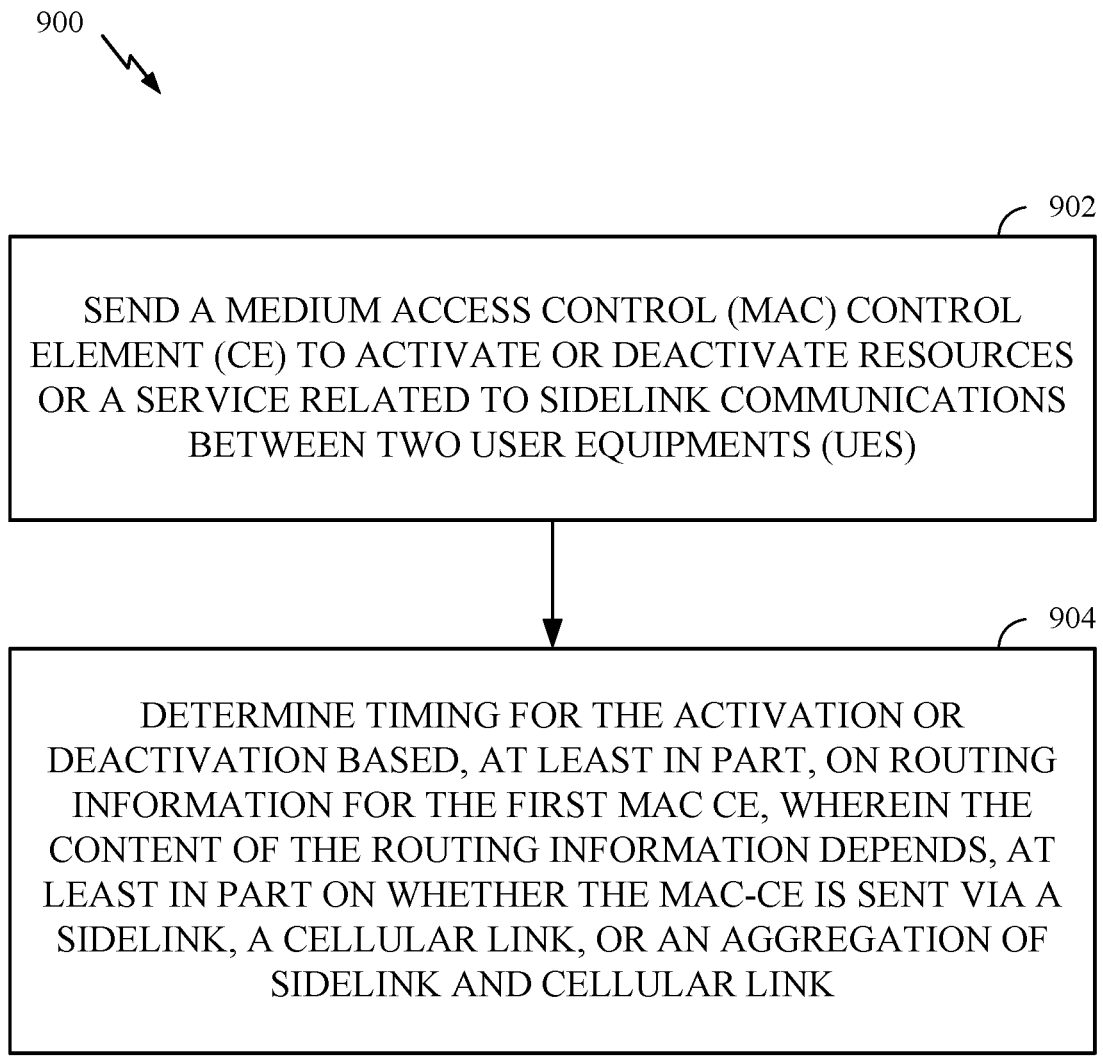
FIG. 9 is a flow diagram illustrating example operations that may be performed by a first node, in accordance with certain aspects of the present disclosure.

FIG. 9 is a flow diagram illustrating example operations 900 that may be performed by a first node to determine MAC-CE activation timing, in accordance with certain aspects of the present disclosure. For example, operations 900 may be performed by a UE or base station shown in FIG. 6.

Operations 900 begin, at 902, by sending a medium access control (MAC) control element (CE) to activate or deactivate resources or a service related to sidelink communications between two user equipments (UEs). At 904, the first node determines timing for the activation or deactivation based, at least in part, on routing information for the first MAC-CE.

Figure 10:
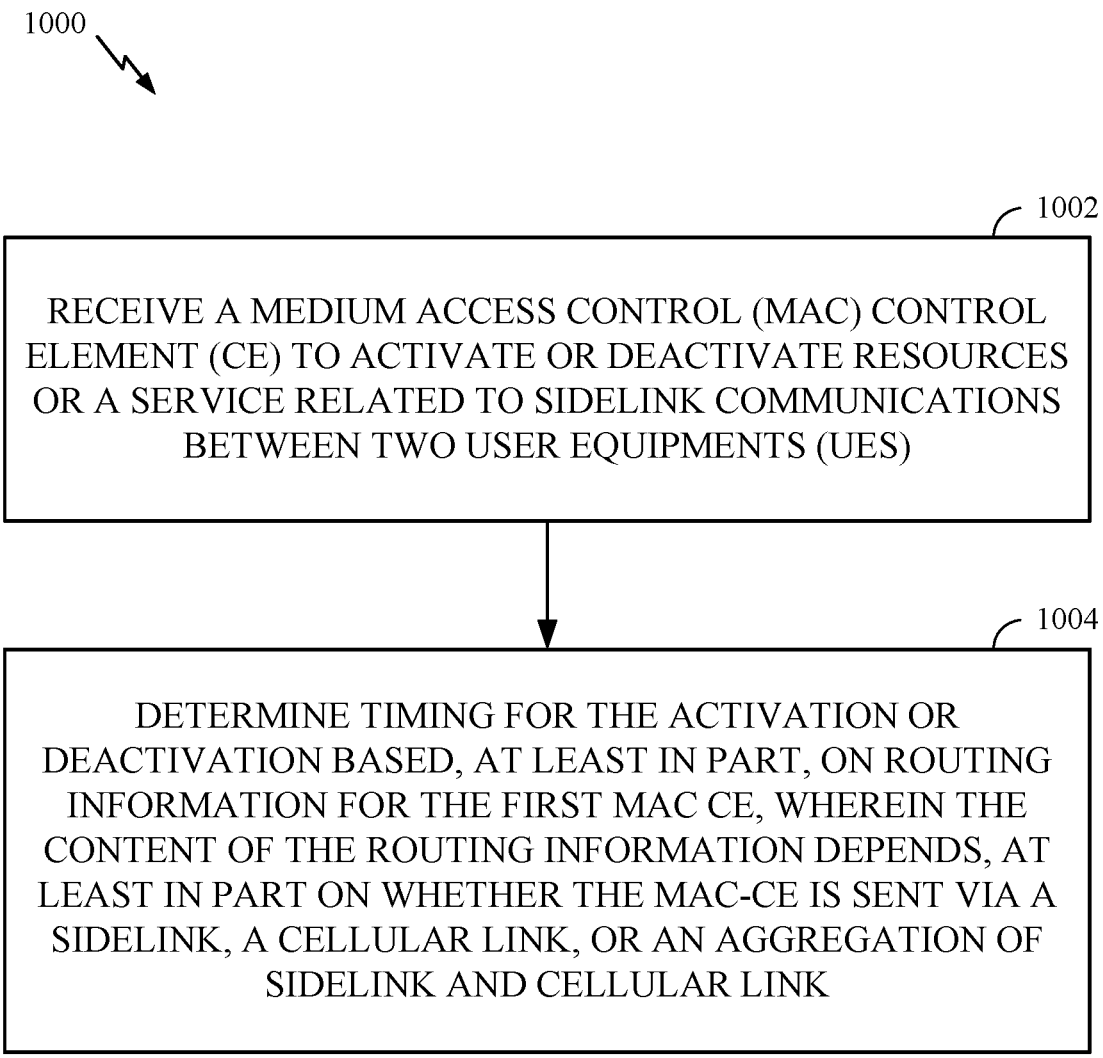
FIG. 10 is a flow diagram illustrating example operations that may be performed by a second node, in accordance with certain aspects of the present disclosure.

FIG. 10 is a flow diagram illustrating example operations 1000 that may be performed by a second node to determine MAC-CE activation timing, in accordance with certain aspects of the present disclosure. For example, operations 1000 may be performed by a UE or base station shown in FIG. 6.

Operations 1000 begin, at 1002, by receiving a medium access control (MAC) control element (CE) to activate or deactivate resources or a service related to sidelink communications between two user equipments (UEs). At 1004, the second node determines timing for the activation or deactivation based, at least in part, on routing information for the first MAC-CE.

As noted above, activation time for a sidelink MAC-CE may be adjusted based on the link and/or route on which it is sent. In some cases, SL MAC-CEs sent on Uu may not have activation times (e.g., UL MAC-CEs, DL MAC-CEs carrying TA commands and recommended bit rates may not have activation times).

As noted above, however, many have activation time based on the time of Acknowledgment (ACK) transmission (e.g., 3 ms or N slots after Ack transmission). The counting of time in such cases either includes or excludes TA commands received during the counting. In some cases, for this purpose, the Ack transmission refers to acknowledgment of the whole TB (as opposed only to the CB/CBG carrying the MAC-CE). In general, UL MAC-CEs do not have activation times, because it is up to the gNB implementation how to respond to them.

SL MAC-CEs sent to gNB with SL-related content may be treated like Uu UL MAC-CEs (e.g., and left to gNB implementation). MAC-CEs sent to a UE over SL, or over DL (with SL-related content) may be treated like Uu DL MAC-CEs. In such cases, activation time may be based on Ack transmission. As noted above, the Ack transmissions (or delivery) time, and also the function mapping this delivery time to the activation time (eg, a delay parameter such as n milliseconds or m slots) may be different for MAC-CEs sent over SL vs over DL.

Thus, routing/relaying information may be considered when determining time for activating/deactivating MAC-CEs sent with or without relaying. In some cases, the timing may also depend on whether or not the Ack transmission is relayed.

For example, if the Ack transmission is not relayed (even though the MAC-CE itself may be relayed the Ack may be direct from final destination to original sender), activation timing may follow the (conventional) Ack transmission timing.

If the Ack is relayed, there are various options for determining the activation timing. For example, according to a first option, the timing of a first hop of the Ack route may be followed. Since the final recipient may not know the first hop, separate signaling may be used (e.g., as part of the Ack, or in DCI/MAC-CE/RRC). In some cases, the timing may be, for example, 3 ms from this timing (as in Uu).

In some cases, this type of fixed timing may not be sufficient time for the Ack to reach the final destination (depending on the number of hops). Therefore, a variable time X ms may be used instead, where the value of X depends on the number of hops. Because the number of actual hops may be dynamic (e.g., as each node may select its own preferred route), a preconfigured (or "expected") number of hops may be used instead.

According to a first option, the timing of a last hop of the Ack route may be used to determine the MAC-CE activation timing. In this case, the recipient knows the timing based on when it receives the Ack. But, in this case, the sender may not know this time. Therefore, rather than a fixed time, the activation timing may be based on a preconfigured/expected timing (based on a number of hops), which effectively becomes equivalent to the option described above with X ms.

If the Ack transmission could be relayed by multiple routes, the number of hops used to determine the X ms may be based on a rule. For example, X could be based on the shortest of the multiple routes or on the longest of the multiple routes (e.g., where length is measured in terms of the number of hops).

Example Aspects

Aspect 1: A method of wireless communications by a first node, comprising preparing at least a first medium access control (MAC) control element (CE) related to sidelink communications between two user equipments (UEs); sending the first MAC-CE on at least one of a sidelink or a cellular link; and providing routing information for the first MAC-CE.

Aspect 2: The method of Aspect 1, wherein the routing information comprises at least one of: a source node, a destination node, or a transit route through one or more nodes.

Aspect 3: The method of Aspect 1, wherein the routing information indicates whether traffic sent with the first MAC-CE is relayed traffic or traffic originating at the first node.

Aspect 4: The method of Aspect 1, wherein routing information is sent with the first MAC-CE.

Aspect 5: The method of Aspect 4, wherein the routing information is included in one or more fields in the first MAC-CE.

Aspect 6: The method of Aspect 4, wherein the routing information is included in a second MAC-CE.

Aspect 7: The method of Aspect 1, wherein the first MAC-CE is included in a transport block (TB) sent via aggregation of sidelink and cellular link.

Aspect 8: The method of Aspect 7, wherein the routing information indicates a first one or more code block groups (CBGs) sent via the sidelink and a second one or more CBGs sent via the cellular link.

Aspect 9: The method of Aspect 8, wherein the first MAC-CE also indicates locations of one or more other MAC-CEs in at least one of the first CBGs or the second CBGs.

Aspect 10: The method of Aspect 1, wherein the content of the routing information depends, at least in part on whether the MAC-CE is sent via a sidelink, a cellular link, or an aggregation of sidelink and cellular link.

Aspect 11: The method of Aspect 1, wherein the first MAC-CE originated from another node and the first node is relaying the first MAC-CE; and the routing information provided by the first node is modified relative to routing information in the first MAC-CE as received by the first node.

Aspect 12: The method of Aspect 11, wherein the modification comprises at least one of: removal of routing information; or updating the routing information based on a route for the first MAC-CE selected by the first node.

Aspect 13: The method of Aspect 1, wherein the first MAC-CE indicates at least one of a sidelink timing advance command, a sidelink transmission power control command, a sidelink scheduling request, a sidelink buffer status report, a sidelink power headroom report, or a recommended bit rate.

Aspect 14: The method of Aspect 1, wherein the first MAC-CE is designed to activate or deactivate resources or a service; and the method further comprises determining timing for the activation or deactivation based, at least in part, on an acknowledgment of the first MAC-CE and the routing information.

Aspect 15: The method of Aspect 14 wherein, if the acknowledgment is relayed, the timing depends at least in part on a number of hops in a route in which the acknowledgment is sent.

Aspect 16: The method of Aspect 15, wherein the first node is configured with a number of candidate hops to expect.

Aspect 17: The method of Aspect 15, wherein the timing is based on a shortest candidate route in terms of the number of hops or a longest candidate route in terms of the number of hops.

Aspect 18: The method of Aspect 14, wherein the timing is based on a first hop in a route in which the acknowledgment is sent; and the first node receives information regarding the number of hops in the route between the first hop to the first node.

Aspect 19: The method of Aspect 14, wherein the timing is based on a last hop in a route in which the acknowledgment is sent.

Aspect 20: A method of wireless communications by a second node, comprising receiving from a first node, on at least one of a sidelink or a cellular link, at least a first medium access control (MAC) control element (CE) related to sidelink communications between two user equipments (UEs); obtaining routing information for the first MAC-CE; and processing first MAC-CE based, at least in part, on the routing information.

Aspect 21: The method of Aspect 20, wherein the routing information comprises at least one of: a source node, a destination node, or a transit route through one or more nodes.

Aspect 22: The method of Aspect 20, wherein the routing information indicates whether traffic sent with the first MAC-CE is relayed traffic or traffic originating at the first node.

Aspect 23: The method of Aspect 20, wherein routing information is obtained with the first MAC-CE.

Aspect 24: The method of Aspect 23, wherein the routing information is included in one or more fields in the first MAC-CE.

Aspect 25: The method of Aspect 23, wherein the routing information is obtained via a second MAC-CE.

Aspect 26: The method of Aspect 20, wherein the first MAC-CE is included in a transport block (TB) sent via aggregation of sidelink and cellular link.

Aspect 27: The method of Aspect 26, wherein the routing information indicates a first one or more code block groups (CBGs) sent via the sidelink and a second one or more CBGs sent via the cellular link.

Aspect 28: The method of Aspect 27, wherein the first MAC-CE also indicates locations of one or more other MAC-CEs in at least one of the first CBGs or the second CBGs.

Aspect 29: The method of Aspect 20, wherein the content of the routing information depends, at least in part on whether the MAC-CE is sent via a sidelink, a cellular link, or an aggregation of sidelink and cellular link.

Aspect 30: The method of Aspect 20, wherein the routing information indicates the first MAC-CE originated from another node and was relayed by the first node.

Aspect 31: The method of Aspect 20, wherein the first MAC-CE indicates at least one of a sidelink timing advance command, a sidelink transmission power control command, a sidelink scheduling request, a sidelink buffer status report, a sidelink power headroom report, or a recommended bit rate.

Aspect 32: The method of Aspect 20, wherein the first MAC-CE is designed to activate or deactivate resources or a service; and the method further comprises determining timing for the activation or deactivation based, at least in part, on an acknowledgment of the first MAC-CE and the routing information.

Aspect 33: The method of Aspect 32 wherein, if the acknowledgment is relayed, the timing depends at least in part on a number of hops in a route in which the acknowledgment is sent.

Aspect 34: The method of Aspect 33, wherein the first node is configured with a number of candidate hops to expect.

Aspect 35: The method of Aspect 33, wherein the timing is based on a shortest candidate route in terms of the number of hops or a longest candidate route in terms of the number of hops.

Aspect 36: The method of Aspect 32, wherein the timing is based on a first hop in a route in which the acknowledgment is sent; and the first node receives information regarding the number of hops in the route between the first hop to the first node.

Aspect 37: The method of Aspect 32, wherein the timing is based on a last hop in a route in which the acknowledgment is sent.

Aspect 38: A method of wireless communications by a first node, comprising sending a medium access control (MAC) control element (CE) to activate or deactivate resources or a service related to sidelink communications between two user equipments (UEs); and determining timing for the activation or deactivation based, at least in part, on routing information for the first MAC-CE.

Aspect 39: A method of wireless communications by a second node, comprising receiving, from a first node, a medium access control (MAC) control element (CE) to activate or deactivate resources or a service related to sidelink communications between two user equipments (UEs); and determining timing for the activation or deactivation based, at least in part, on routing information for the first MAC-CE.

Aspect 40: An apparatus for wireless communications by a first node, comprising means for preparing at least a first medium access control (MAC) control element (CE) related to sidelink communications between two user equipments (UEs); means for sending the first MAC-CE on at least one of a sidelink or a cellular link; and means for providing routing information for the first MAC-CE.

Aspect 41: The apparatus of Aspect 40, wherein the routing information comprises at least one of: a source node, a destination node, or a transit route through one or more nodes.

Aspect 42: The apparatus of Aspect 40, wherein the routing information indicates whether traffic sent with the first MAC-CE is relayed traffic or traffic originating at the first node.

Aspect 43: The apparatus of Aspect 40, wherein routing information is sent with the first MAC-CE.

Aspect 44: The apparatus of Aspect 43, wherein the routing information is included in one or more fields in the first MAC-CE.

Aspect 45: The apparatus of Aspect 43, wherein the routing information is included in a second MAC-CE.

Aspect 46: The apparatus of Aspect 40, wherein the first MAC-CE is included in a transport block (TB) sent via aggregation of sidelink and cellular link.

Aspect 47: The apparatus of Aspect 46, wherein the routing information indicates a first one or more code block groups (CBGs) sent via the sidelink and a second one or more CBGs sent via the cellular link.

Aspect 48: The apparatus of Aspect 47, wherein the first MAC-CE also indicates locations of one or more other MAC-CEs in at least one of the first CBGs or the second CBGs.

Aspect 49: The apparatus of Aspect 40, wherein the content of the routing information depends, at least in part on whether the MAC-CE is sent via a sidelink, a cellular link, or an aggregation of sidelink and cellular link.

Aspect 50: The apparatus of Aspect 40, wherein the first MAC-CE originated from another node and the first node is relaying the first MAC-CE; and the routing information provided by the first node is modified relative to routing information in the first MAC-CE as received by the first node.

Aspect 51: The apparatus of Aspect 50, wherein the modification comprises at least one of: removal of routing information; or updating the routing information based on a route for the first MAC-CE selected by the first node.

Aspect 52: The apparatus of Aspect 40, wherein the first MAC-CE indicates at least one of a sidelink timing advance command, a sidelink transmission power control command, a sidelink scheduling request, a sidelink buffer status report, a sidelink power headroom report, or a recommended bit rate.

Aspect 53: The apparatus of Aspect 40, wherein the first MAC-CE is designed to activate or deactivate resources or a service; and the apparatus further comprises means for determining timing for the activation or deactivation based, at least in part, on an acknowledgment of the first MAC-CE and the routing information.

Aspect 54: The apparatus of Aspect 53 wherein, if the acknowledgment is relayed, the timing depends at least in part on a number of hops in a route in which the acknowledgment is sent.

Aspect 55: The apparatus of Aspect 54, wherein the first node is configured with a number of candidate hops to expect.

Aspect 56: The apparatus of Aspect 54, wherein the timing is based on a shortest candidate route in terms of the number of hops or a longest candidate route in terms of the number of hops.

Aspect 57: The apparatus of Aspect 53, wherein the timing is based on a first hop in a route in which the acknowledgment is sent; and the first node receives information regarding the number of hops in the route between the first hop to the first node.

Aspect 58: The apparatus of Aspect 53, wherein the timing is based on a last hop in a route in which the acknowledgment is sent.

Aspect 59: An apparatus for wireless communications by a second node, comprising means for receiving from a first node, on at least one of a sidelink or a cellular link, at least a first medium access control (MAC) control element (CE) related to sidelink communications between two user equipments (UEs); means for obtaining routing information for the first MAC-CE; and means for processing first MAC-CE based, at least in part, on the routing information.

Aspect 60: The apparatus of Aspect 59, wherein the routing information comprises at least one of: a source node, a destination node, or a transit route through one or more nodes.

Aspect 61: The apparatus of Aspect 59, wherein the routing information indicates whether traffic sent with the first MAC-CE is relayed traffic or traffic originating at the first node.

Aspect 62: The apparatus of Aspect 59, wherein routing information is obtained with the first MAC-CE.

Aspect 63: The apparatus of Aspect 62, wherein the routing information is included in one or more fields in the first MAC-CE.

Aspect 64: The apparatus of Aspect 62, wherein the routing information is obtained via a second MAC-CE.

Aspect 65: The apparatus of Aspect 59, wherein the first MAC-CE is included in a transport block (TB) sent via aggregation of sidelink and cellular link.

Aspect 66: The apparatus of Aspect 65, wherein the routing information indicates a first one or more code block groups (CBGs) sent via the sidelink and a second one or more CBGs sent via the cellular link.

Aspect 67: The apparatus of Aspect 66, wherein the first MAC-CE also indicates locations of one or more other MAC-CEs in at least one of the first CBGs or the second CBGs.

Aspect 68: The apparatus of Aspect 59, wherein the content of the routing information depends, at least in part on whether the MAC-CE is sent via a sidelink, a cellular link, or an aggregation of sidelink and cellular link.

Aspect 69: The apparatus of Aspect 59, wherein the routing information indicates the first MAC-CE originated from another node and was relayed by the first node.

Aspect 70: The apparatus of Aspect 59, wherein the first MAC-CE indicates at least one of a sidelink timing advance command, a sidelink transmission power control command, a sidelink scheduling request, a sidelink buffer status report, a sidelink power headroom report, or a recommended bit rate.

Aspect 71: The apparatus of Aspect 59, wherein the first MAC-CE is designed to activate or deactivate resources or a service; and the apparatus further comprises means for determining timing for the activation or deactivation based, at least in part, on an acknowledgment of the first MAC-CE and the routing information.

Aspect 72: The apparatus of Aspect 71 wherein, if the acknowledgment is relayed, the timing depends at least in part on a number of hops in a route in which the acknowledgment is sent.

Aspect 73: The apparatus of Aspect 72, wherein the first node is configured with a number of candidate hops to expect.

Aspect 74: The apparatus of Aspect 72, wherein the timing is based on a shortest candidate route in terms of the number of hops or a longest candidate route in terms of the number of hops.

Aspect 75: The apparatus of Aspect 71, wherein the timing is based on a first hop in a route in which the acknowledgment is sent; and the first node receives information regarding the number of hops in the route between the first hop to the first node.

Aspect 76: The apparatus of Aspect 71, wherein the timing is based on a last hop in a route in which the acknowledgment is sent.

Aspect 77: An apparatus for wireless communications by a first node, comprising means for sending a medium access control (MAC) control element (CE) to activate or deactivate resources or a service related to sidelink communications between two user equipments (UEs); and means for determining timing for the activation or deactivation based, at least in part, on routing information for the first MAC-CE.

Aspect 78: An apparatus for wireless communications by a second node, comprising means for receiving, from a first node, a medium access control (MAC) control element (CE) to activate or deactivate resources or a service related to sidelink communications between two user equipments (UEs); and means for determining timing for the activation or deactivation based, at least in part, on routing information for the first MAC-CE.

Aspect 79: An apparatus for wireless communications by a first node, comprising at least one processor and a memory configured to prepare at least a first medium access control (MAC) control element (CE) related to sidelink communications between two user equipments (UEs); send the first MAC-CE on at least one of a sidelink or a cellular link; and provide routing information for the first MAC-CE.

Aspect 80: An apparatus for wireless communications by a second node, comprising at least one processor and a memory configured to receive from a first node, on at least one of a sidelink or a cellular link, at least a first medium access control (MAC) control element (CE) related to sidelink communications between two user equipments (UEs); obtain routing information for the first MAC-CE; and process first MAC-CE based, at least in part, on the routing information.

Aspect 81: An apparatus for wireless communications by a first node, comprising: at least one processor and a memory configured to send a medium access control (MAC) control element (CE) to activate or deactivate resources or a service related to sidelink communications between two user equipments (UEs); and determine timing for the activation or deactivation based, at least in part, on routing information for the first MAC-CE.

Aspect 82: An apparatus for wireless communications by a second node, comprising at least one processor and a memory configured to receive, from a first node, a medium access control (MAC) control element (CE) to activate or deactivate resources or a service related to sidelink communications between two user equipments (UEs); and determine timing for the activation or deactivation based, at least in part, on routing information for the first MAC-CE.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components. For example, various operations shown in FIGS. 7-10 may be performed by various processors shown in FIG. 4, such as processors 466, 458, 464, and/or controller/processor 480 of the UE 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a first node, comprising:
   preparing at least a first medium access control (MAC) control element (CE) related to sidelink communications between two user equipments (UEs);
   sending the first MAC-CE via an aggregation of a sidelink and a cellular link, wherein the first MAC-CE is designed to activate or deactivate resources or a service;
   providing routing information for the first MAC-CE, wherein content of the routing information depends, at least in part on the first MAC-CE being sent via the aggregation of the sidelink and the cellular link including the first node sending a first set of code block groups (CBGs) of the first MAC-CE on the sidelink and a second set of CBGs of the first MAC-CE on the cellular link; and
   determining timing for the activation or deactivation of the resources or the service based, at least in part, on an acknowledgment of the first MAC-CE and the routing information.

2. The method of claim 1, wherein the routing information comprises at least one of: a source node, a destination node, or a transit route through one or more nodes.

3. The method of claim 1, wherein the routing information indicates whether traffic sent with the first MAC-CE is relayed traffic or traffic originating at the first node.

4. The method of claim 1, wherein routing information is sent with the first MAC-CE.

5. The method of claim 1, wherein the first MAC-CE is included in a transport block (TB) sent via the aggregation of the sidelink and the cellular link.

6. The method of claim 1, wherein:
   the first MAC-CE originated from another node and the first node is relaying the first MAC-CE; and
   the routing information provided by the first node is modified relative to routing information in the first MAC-CE as received by the first node.

7. The method of claim 1, wherein the first MAC-CE indicates at least one of a sidelink timing advance command, a sidelink transmission power control command, a sidelink power headroom report, or a recommended bit rate.

8. The method of claim 1, wherein the first MAC-CE indicates at least one of a sidelink scheduling request or a sidelink buffer status report.

9. The method of claim 1, wherein the content of the routing information includes an indication that the first set of CBGs are sent on the sidelink and the second set of CBGs are sent on the cellular link.

10. A method of wireless communications by a second node, comprising:
    receiving from a first node, via an aggregation of a sidelink and a cellular link, at least a first medium access control (MAC) control element (CE) related to sidelink communications between two user equipments (UEs);
    obtaining routing information for the first MAC-CE, wherein the first MAC-CE is designed to activate or deactivate resources or a service;
    processing the first MAC-CE based, at least in part, on the routing information, wherein content of the routing information depends, at least in part on the first MAC-CE being sent via the aggregation of the sidelink and the a cellular link including the first node sending a first set of code block groups (CBGs) of the first MAC-CE on the sidelink and a second set of CBGs of the first MAC-CE on the cellular link; and
    determining timing for the activation or deactivation of the resources or the service based, at least in part, on an acknowledgment of the first MAC-CE and the routing information.

11. The method of claim 10, wherein the routing information indicates whether traffic sent with the first MAC-CE is relayed traffic or traffic originating at the first node.

12. The method of claim 10, wherein the routing information is obtained with the first MAC-CE.

13. The method of claim 10, wherein the first MAC-CE is included in a transport block (TB) sent via the aggregation of the sidelink and the cellular link.

14. The method of claim 10, wherein:
    the routing information indicates the first MAC-CE originated from another node and was relayed by the first node.

15. The method of claim 10, wherein the first MAC-CE indicates at least one of a sidelink timing advance command, a sidelink transmission power control command, a sidelink power headroom report, or a recommended bit rate.

16. The method of claim 10, wherein the first MAC-CE indicates at least one of a sidelink scheduling request or a sidelink buffer status report.

17. An apparatus for wireless communications by a first node, comprising:
    means for preparing at least a first medium access control (MAC) control element (CE) related to sidelink communications between two user equipments (UEs);
    means for sending the first MAC-CE via an aggregation of a sidelink and a cellular link, wherein the first MAC-CE is designed to activate or deactivate resources or a service; and
    means for providing routing information for the first MAC-CE, wherein content of the routing information depends, at least in part on the first MAC-CE being sent via the aggregation of the sidelink and the cellular link including the first node sending a first set of code block groups (CBGs) of the first MAC-CE on the sidelink and a second set of CBGs of the first MAC-CE on the cellular link; and
    means for determining timing for the activation or deactivation of the resources or the service based, at least in part, on an acknowledgment of the first MAC-CE and the routing information.

18. The apparatus of claim 17, wherein the routing information indicates whether traffic sent with the first MAC-CE is relayed traffic or traffic originating at the first node.

19. The apparatus of claim 17, wherein the first MAC-CE is included in a transport block (TB) sent via the aggregation of the sidelink and the cellular link.

20. The apparatus of claim 17, wherein:
    the first MAC-CE originated from another node and the first node is relaying the first MAC-CE; and
    the routing information provided by the first node is modified relative to routing information in the first MAC-CE as received by the first node.

21. An apparatus for wireless communications by a second node, comprising:
    means for receiving from a first node, via an aggregation of a sidelink and a cellular link, at least a first medium access control (MAC) control element (CE) related to sidelink communications between two user equipments (UEs);
    means for obtaining routing information for the first MAC-CE, wherein the first MAC-CE is designed to activate or deactivate resources or a service;
    means for processing the first MAC-CE based, at least in part, on the routing information, wherein content of the routing information depends, at least in part on the first MAC-CE being sent via the aggregation of the sidelink and the cellular link including the first node sending a first set of code block groups (CBGs) of the first MAC-CE on the sidelink and a second set of CBGs of the first MAC-CE on the cellular link; and
    means for determining timing for the activation or deactivation of the resources or the service based, at least in part, on an acknowledgment of the first MAC-CE and the routing information.

22. The apparatus of claim 21, wherein the routing information indicates whether traffic sent with the first MAC-CE is relayed traffic or traffic originating at the first node.

23. The apparatus of claim 21, wherein the routing information is obtained with the first MAC-CE.

24. The apparatus of claim 21, wherein the first MAC-CE is included in a transport block (TB) sent via the aggregation of the sidelink and the cellular link.

25. The apparatus of claim 21, wherein:
    the routing information indicates the first MAC-CE originated from another node and was relayed by the first node.

* * * * *